J. M. McLAREN.
SAW CARRIAGE SET WORKS.
APPLICATION FILED APR. 21, 1908.
902,994.
Patented Nov. 3, 1908.
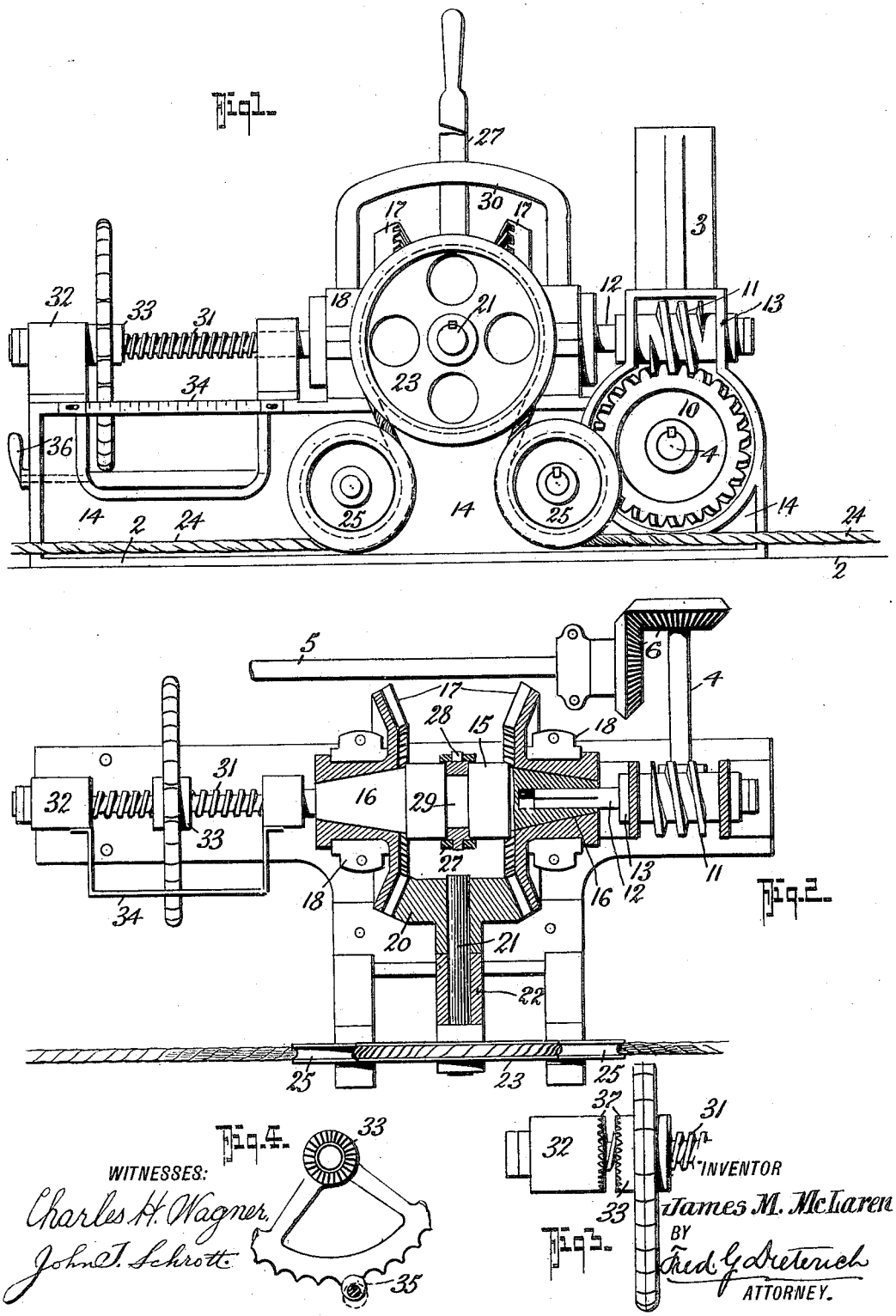
WITNESSES:
Charles H. Wagner
John T. Schrott
INVENTOR
James M. McLaren
BY
Fred G. Dieterich
ATTORNEY.
THE NORRIS PETERS CO., WASHINGTON, D. C.

UNITED STATES PATENT OFFICE.

JAMES M. McLAREN, OF VANCOUVER, BRITISH COLUMBIA, CANADA.

SAW-CARRIAGE SET-WORKS.

No. 902,994.  Specification of Letters Patent.  Patented Nov. 3, 1908.

Application filed April 21, 1908. Serial No. 428,437.

*To all whom it may concern:*

Be it known that I, JAMES M. McLAREN, a citizen of the Dominion of Canada, residing at Vancouver, in the Province of British Columbia, Canada, have invented a new and useful Improvement in Saw-Carriage Set-Works, of which the following is a specification.

This invention relates to a power operated set works, designed to set up the log carrying head blocks of a saw carriage, and to automatically release the operating mechanism when the head blocks have been advanced to a predetermined thickness of board which it may be desired to remove from the log.

The invention is fully described in the following specification, reference being made to the drawings by which it is accompanied, in which:

Figure 1 is an elevation of the set works from the back of the saw carriage, Fig. 2, a plan and part section of the same, Fig. 3, shows the serrations of the adjacent faces of the gage nut and bearing, and Fig. 4, the means for preventing the rotation of the nut hand wheel.

In these drawings 2 represents the upper face of the log carriage, and 3 one of the head block knees against which the log to be cut is held, and moved toward the saw for each board to be cut. The knee is moved forward or back by means of a quick pitch screw 4 rotatable in the head block and engaging a nut secured to the knee.

The head block screws 4 of the several head blocks, of which there are generally three, are simultaneously operated by bevel gears 6 from a shaft 5 extending lengthwise of the saw carriage, and the end of the screw 4 of the leading head block is usually produced backward to receive the ratchet mechanism by which the several knees are hand operated.

In the application of my power set works to such existing mechanism I secure to the backwardly projecting end of 4, a worm wheel 10 into the teeth of which meshes a worm 11 secured on a shaft 12 rotatable in bearings 13 of the frame 14, which carries all the principal mechanism of my set works.

The end of the worm shaft 12 is in driving engagement with a cone member 15 having reversed cones 16 which fit into correspondingly bored bevel gears 17 rotatable in bearings 18 of the frame 14. The dimensions of the cone member 15 in relation to the conical seats 16 of the bevel gears are such that, when the member 15 is in the mid-position between the gears, the cones are free from frictional engagement with either bevel wheel and these wheels will run free without imparting their movement to the worm shaft 12, but if moved endwise, for which movement provision is made in the connection to the shaft 12, the cone member 15 will rotate with the bevel gear with which it is moved into engagement and the shaft 12 will be driven thereby to operate the head block screws 4.

The bevel gears 17 are driven by a bevel pinion 20 secured on a short shaft 21 rotatable in a bearing 22 secured to the frame 14, to the outer end of which shaft is secured a rope sheave 23 round which an endless rope 24 is passed over idlers 25. The endless rope 24 passes over sheaves at each end beyond the log carriage travel, and when the saw is in use is continually driven by one of them from any convenient source of power.

The cone member 15 is moved endwise by a fork lever 27 engaging studs 28 projecting from a ring fitting a groove 29 in 15 and to maintain the cone member in the mid-position and out of engagement with either bevel gear the lever is provided with a segmented guide 30 having a slight recess in the mid-position into which the lever is held by the resilience of the segment 30, but from which it may readily be sprung when required. This is the operative mechanism by which the head block knees are advanced to or withdrawn from the saw.

It is required now to describe the means whereby this operative mechanism is automatically thrown out of action when the worm shaft 12 has performed the required number of revolutions to effect the desired movement of the head block knees.

Secured to one end of the cone member 15 or forming a part of it, is a screw 31 supported in bearings 32 on the common frame 14, and on this screw 31 is a nut 33 having a hand wheel by which it may be spun to move it rapidly to any desired position on the screw. The position of this nut in its distance from one or other of the bearings will, if the nut is held against rotation, determine the number of revolutions which the worm shaft will require to make, for when the nut encounters the adjacent face of the bearing 32, the cone member 15 will be endwise moved either one way or the other and will free the cone 16 from frictional engagement with the bevel gear by which it is driven.

A gage bar 34 may be secured to the frame adjacent to the rim of the hand wheel by which the nut may be set to the desired distance from the bearing 32.

The hand wheel of the nut may in any approved manner be prevented from rotating when the device has been set for any desired thickness of board, care being taken to allow the nut to move endwise as the screw rotates.

In the drawing the nut is checked against rotation by providing serrations in the rim of the hand wheel and a rod 35 eccentrically mounted in the base of the frame adjacent which rod may be turned by a small hand lever 36 to throw it into engagement with the serrations or clear it therefrom.

To insure that when the nut 33 engages the face of the bearing 32 it will not be rotated under the increased friction thereby set up on the thread, the adjacent faces of nut and bearing may be provided with radial V serrations 37 as shown in Fig. 3.

In the operation of the device the nut 33 is by means of its hand wheel set to a position on the screw 31 corresponding to the thickness of the board, which it is desired to cut from the log, plus the thickness of the saw cut, and the hand wheel is secured against rotation by the eccentrically mounted rod 35. This operation of setting may be performed for the next cut while the saw is cutting a board from the log, as during the operation of sawing the set works is out of action, the lever 27 being in the mid-position with both cones 16 out of frictional engagement with their bevel gears.

When a board has been cut from the log and it is desired to set forward the head block knees to carry the log forward for another cut, the cone member 15 is by means of the lever 27 pressed into frictional engagement with the bevel gear which drives the head block screw 4 in the required direction to set forward the knees, when the worm 11 is immediately rotated to operate the head block screw 4. The set works screw 31 will rotate with it and as the nut 33 cannot rotate it will be carried toward the bearing 32 from which the measurement is made and as soon as the nut 33 contacts with the bearing 32 the screw 31 will be endwise moved and the cone member 15 released from frictional engagement with the bevel gear 17 when the worm shaft will cease to rotate and the desired forward set of the head block knees will have been accomplished.

Obviously when a log has been used up and it is required to run the head block knees back for the reception of a fresh log the cone member 15 may be moved by means of the lever 27 to press the other cone 16 into frictional engagement with the other bevel wheel which will rotate the shaft 12 in the opposite direction and withdraw the head block knees from the saw. During this operation, as the mechanism will not require to be automatically thrown out of action, the eccentric rod 35 may be released from engagement with the hand wheel of the nut 33 and that nut permitted to rotate. The release of the operating mechanism, when the desired position of the head block knees is attained, will then be effected by hand.

The first dimension of the graduated bar 34 may obviously include the saw thickness and thus avoid the necessity of the operator being required to add the thickness of the saw to a given thickness of board, and in order to enable the gage to be adjusted to a change of saw thickness the attachment of the gage bar to the frame may have elongated apertures for the attaching screws.

The mechanism is simple and direct in its operation and has the advantage of being susceptible of application to existing saw carriages, as but a trifling modification of existing parts is required.

Having now particularly described my invention and the manner of its operation and use, I hereby declare that what I claim as new and desire to be protected in by Letters Patent, is:

1. As an automatic set works for a saw carriage, the combination with the mechanism whereby the head block knees are simultaneously operated, of a screw rotating with such mechanism, a nut on said screw the position of which nut in its distance from an adjacent bearing will represent the desired movement of the head block knees, releasable means for preventing rotation of the nut, and means whereby the movement of the nut along the screw will release the operating mechanism of the head block knees.

2. As an automatic set works for a saw carriage, the combination with the mechanism whereby the head block knees are simultaneously operated, of a screw rotating with such mechanism, a nut on said screw the position of which nut in its distance from an adjacent bearing will represent a desired movement of the head block knees, of releasable means for preventing the rotation of the nut whereby the rotation of the screw will carry the nut toward the adjacent bearing, and means whereby the contact of the nut face with the adjacent face of the bearing will disengage the operating mechanism by which the head block knees are moved toward the saw.

3. In an automatic set works of the class described, the combination with an operating mechanism by which the head block screws are simultaneously rotated, of an endless rope traveling lengthwise of the saw carriage, a rope sheave rotatably mounted on the saw carriage over which the endless rope passes, a bevel gear rotatable with the sheave said bevel gear meshing with two conically bored bevel gears one on each side rotatable in bearings on the saw carriage the axis of rotation of the last named two gears being normal to those of the head block screws, a rotatable member fitting the conical bores of the bevel gears and free from engagement with either but susceptible of limited endwise movement to throw it into frictional engagement with either bevel gear, a screw projecting from one end of the conical member and rotatable between bearings on the saw carriage, a nut threaded on said screw, releasable means for preventing rotation of the nut on the screw while permitting endwise movement of the same thereon, and means for rotating one of the head block screws from the conical member.

4. In an automatic saw set works of the class described, the combination with an operating mechanism by which the head block screws are simultaneously rotated, of an endless rope traveling lengthwise of the saw carriage, a rope sheave rotatably mounted on the saw carriage over which the endless rope passes, a bevel gear rotatable with the sheave said bevel gear meshing with two conically bored bevel gears rotatable one on each side in bearings on the saw carriage the axis of rotation of which gears is normal to the head block screws, a conical member fitting the bores of the bevel gears and free from engagement with either but susceptible of limited endwise movement to throw it into frictional engagement with either bevel gear, a screw projecting from one end of the conical member and rotatable between bearings on the saw carriage, a nut threaded on said screw the adjacent faces of the nut and bearing being provided with corresponding radial serrations, means for rapidly rotating the nut, releasable means for preventing rotation of the nut while permitting endwise movement of the same on the screw, a worm in rotatable engagement with the conical member said worm meshing with a worm wheel secured to one of the head block screws.

5. In a saw set works of the class described, the combination with an operating mechanism by which the head block screws may be rotated by a source of power external to the saw carriage, means for connecting said operative mechanism to drive the head block screws, means for automatically releasing said operative mechanism said means comprising a screw rotatable in bearings of the saw carriage, a nut on said screw, and releasable means for preventing rotation of the nut while permitting endwise movement of the same on the screw.

In testimony whereof I have signed my name to this specification in the presence of two subscribing witnesses.

JAMES M. McLAREN.

Witnesses:
ROBERT THOMSON,
ROWLAND BRITTAIN.